United States Patent [19]
Knollenberg et al.

[11] 3,941,982
[45] Mar. 2, 1976

[54] METHOD AND APPARATUS FOR TWO-DIMENSIONAL DATA ACQUISITION

[75] Inventors: Robert George Knollenberg, Boulder Heights; Albury John Dascher, Broomfield, both of Colo.

[73] Assignee: Particle Measuring Systems, Inc., Boulder, Colo.

[22] Filed: July 22, 1974

[21] Appl. No.: 490,540

[52] U.S. Cl.... 235/92 DP; 179/15.55 T; 235/92 SH; 235/92 PC; 235/92 V; 235/92 R; 340/146.3 MA
[51] Int. Cl.² ......................................... G06K 9/12
[58] Field of Search.......... 235/92 V, 92 PC, 92 SH, 235/92 DP, 92 EA; 340/146.3 MA, 146.3 H; 179/15.55 T; 328/43, 37

[56] References Cited
UNITED STATES PATENTS

| | | | |
|---|---|---|---|
| 3,200,373 | 8/1965 | Rabinow................... | 340/146.3 MA |
| 3,303,466 | 2/1967 | Holt.......................... | 340/146.3 MA |
| 3,422,422 | 1/1969 | Frank et al..................... | 235/92 EA |
| 3,621,150 | 11/1971 | Pappas......................... | 179/15.55 T |
| 3,634,823 | 1/1972 | Dietrich et al........... | 340/146.3 MA |

*Primary Examiner*—Joseph M. Thesz, Jr.
*Attorney, Agent, or Firm*—Thomas W. O'Rourke

[57] ABSTRACT

Two-dimensional data may be acquired at extremely high rates by means of a linear sensor array, and ganged shift registers with each sensor associated with at least one shift register. The state of each sensor is sampled periodically in accord with a selected, relatively high clock frequency and each sampling is sequentially recorded in the shift register associated with a specific sensor. A first dimension is provided by the linear nature of the sensor array and the second dimension is supplied by the sampling clock frequency as a subject moves past the sensor array. In a more advanced embodiment, the sampling operates only during the occurrence of an event and data is cyclically recorded in one group of shift registers at a rapid rate while previous data is unloaded from an alternative group of shift registers at a conventional rate.

7 Claims, 4 Drawing Figures

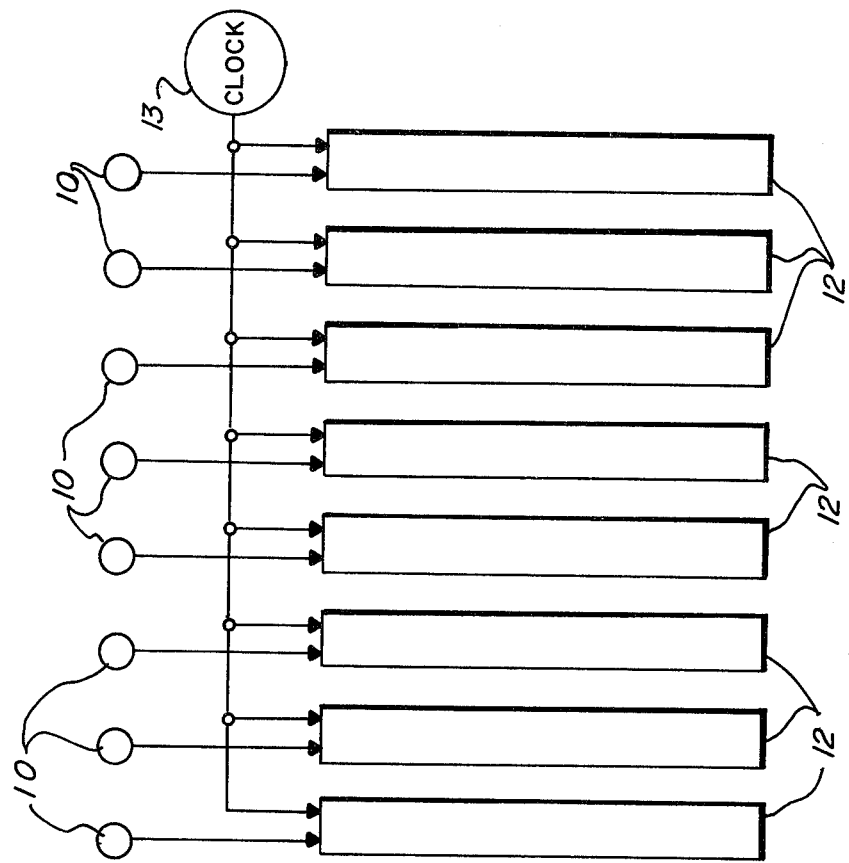
Fig_1
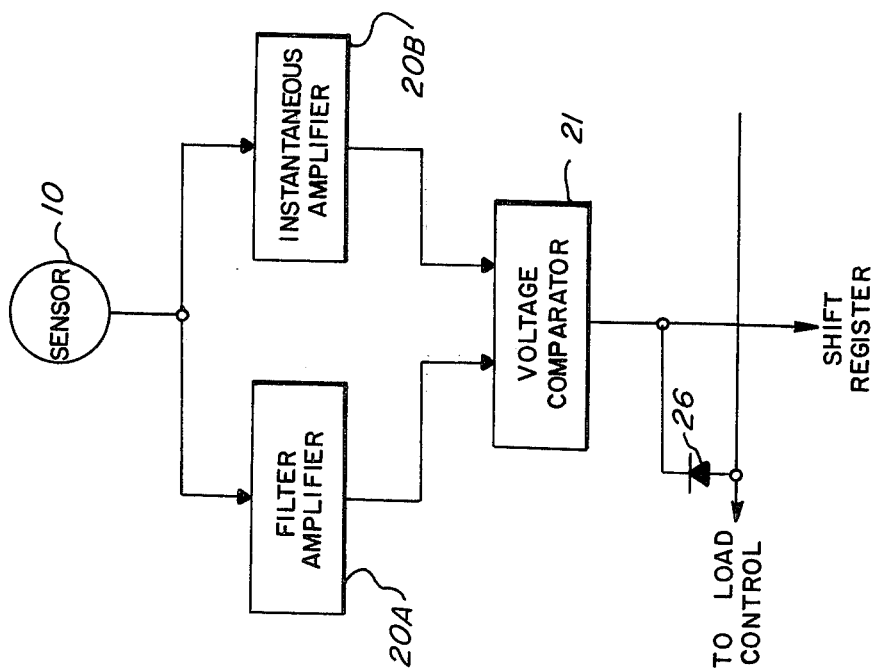
Fig_3

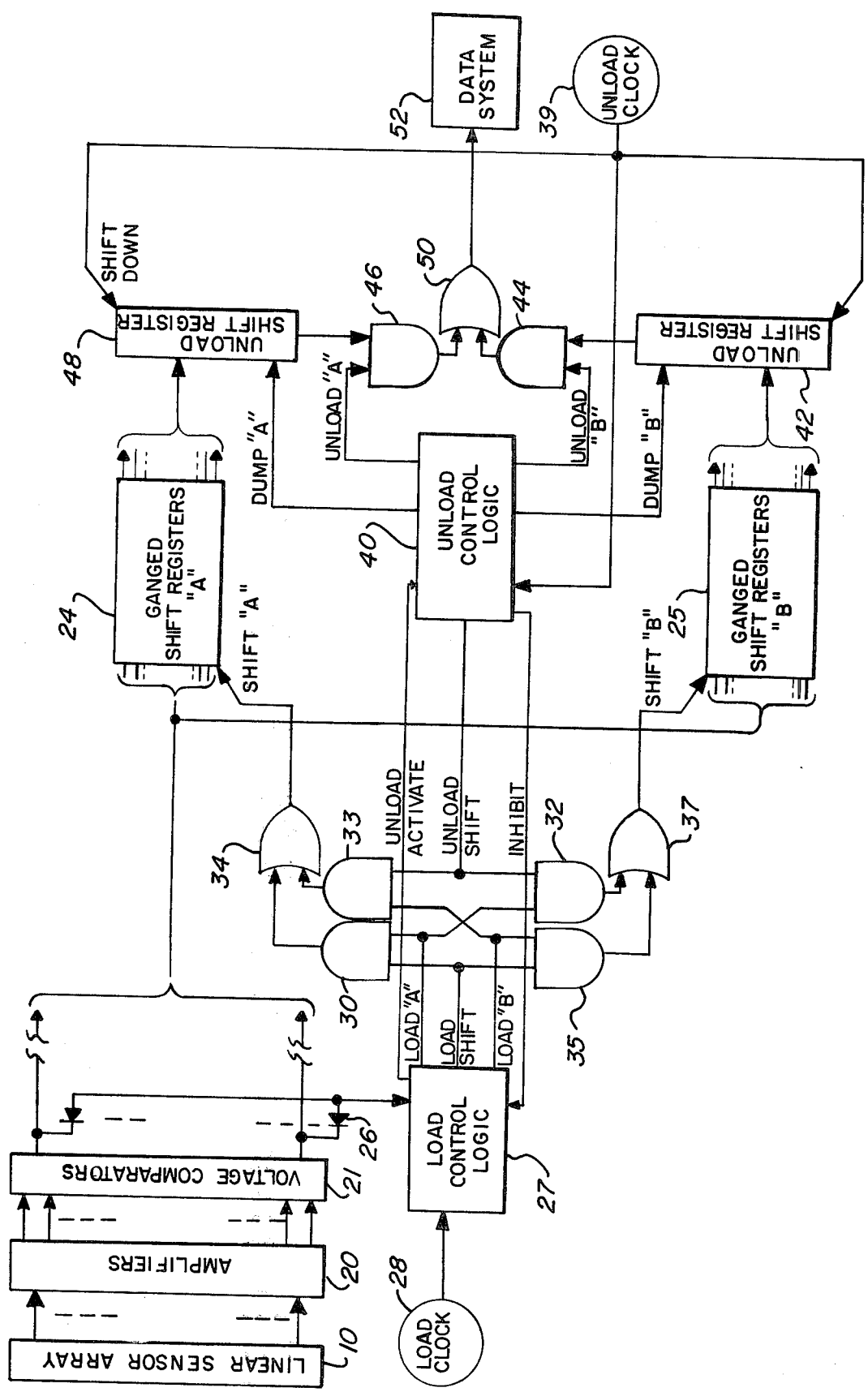
Fig_2

Fig-4

METHOD AND APPARATUS FOR TWO-DIMENSIONAL DATA ACQUISITION

BACKGROUND OF THE INVENTION

1. Field of the Invention

The present invention relates generally to acquisition of two-dimensional data from linear sensor arrays, and more particularly to high-speed acquisition of two-dimensional data from such arrays.

2. Description of the Prior Art

The desirability of determining two-dimensional data, i.e., the size and/or profile of objects or particles in two dimensions, utilizing a linear sensor array and sampling the condition of the array periodically has, in the broad sense, been recognized and used effectively for some time. For example, the RETICON image sensors use linear arrays which are periodically sampled. In general, the sampling of the array is done on a sensor by sensor basis, and a bit from each sensor across the array is stored consecutively in a single shift register. U.S. Pat. No. 3,692,980 describes, in conjunction with other not necessarily germane sampling equipment, the use of a photocell array wherein the data is loaded into a single shift register. This approach is entirely satisfactory for the purpose for which it is intended, but is inadequate for high-speed events wherein relatively small objects or particles move rapidly across the sensor array. The sampling frequency is limited by the rates at which the sensors can be individually sampled in a single sweep. In some instances, the object being measured may move appreciably during the sampling from one end to the other end of the sensor array.

A number of other means for counting and sizing particles exist. U.S. Pat. No. 2,958,464 discloses one approach to this end, but utilizes a two-dimensional array of sensors.

Also, it is not an uncommon requirement to sample random events which provide data at an extremely high rate during the event, but since the events are not constant, do not, on an average, provide data at an overall high rate. None of the above approaches provide a means for receiving and storing data at a high instantaneous rate while providing for a more convention data output rate for supplying data to conventional systems.

SUMMARY OF THE INVENTION

The present invention, which provides a heretofore unavailable improvement in the provision of two-dimensional data from linear arrays of sensors, comprises an arrangement in which a linear array of sensors is connected to a plurality of shift registers with each sensor individually associated with at least one of the ganged shift registers. All sensors are simultaneously sampled and the data from each sensor supplied directly to an individual shift register. By using this method and arrangement, extremely high resolution may be obtained utilizing very high rates of data acquisition. Further, with additional circuitry, the arrangement can acquire and store data at extremely high rates when an event occurs, and supply the data to the ultimate data recording or readout system at a more conventional rate while the sensor system idles between events. Operation and termination of the data acquisition can be initiated by event occurrence and completion, respectively.

Accordingly, an object of the present invention is to provide a new and improved method and device for rapid acquisition of two-dimensional data from a linear array of sensors.

Another object of the present invention is to provide a new and improved method and device for recording in two dimensions the size and/or shape of an article with high resolution.

Yet another object of the present invention is to provide a new and improved method and device for accumulating and smoothing the delivery of data from events which intermittently provide data at high rates.

Still another object of the present invention is to provide a new and improved method and device for recording two dimensional data from a linear array of sensors only upon the occurrence of a subject event.

These and other objects and features of the present invention will become apparent from the following description.

BRIEF DESCRIPTION OF THE DRAWINGS

In the drawings:

FIG. 1 is a partial schematic diagram of a simplified data acquisition device in accordance with the present invention;

FIG. 2 is a schematic diagram of a particularly advantageous embodiment of the present invention;

FIG. 3 is a schematic diagram of an element of the device shown in FIG. 1; and

FIG. 4 is a representation of data stored in the ganged shift registers coordinated to the passing of a superimposed particle.

DETAILED DESCRIPTION OF THE DRAWINGS

Turning now to the drawings, wherein like components are designated by like reference numerals throughout the various figures, a basic device for high-speed acquisition of two-dimensional data from a linear array of sensors is illustrated in FIG. 1. The device comprises a linear array of individual sensors 10, each connected directly to an individual shift register 12. A clock 13 concurrently activates each of the ganged shift registers 12 to sample the condition of sensors 10.

Sensors 10 can, for instance, be proximity detectors, various transducers, etc., but for the purposes of this discussion shall primarily be considered photodiodes. Accordingly, the condition of the photodiode is either "0," when shadowed, or "1" when illuminated.

As clock 13 simultaneously activates ganged shift registers 12, the condition of the array of sensors 10 is recorded in a corresponding level of shift registers 12. After a predetermined period of time, clock 13 repeats the sampling thereby providing, as one dimension, the physical arrangement of sensors 10, and as another dimension, the change in the condition of the sensors 10 with regard to time. When the speed or size of the subject being measured is known, determination of time as the second dimension permits comprehensive conclusions to be made.

A somewhat simplified, diagrammatic representation of a system which acquires data at high speeds, and which supplies data to the data system at conventional prior art speeds and manner is shown in FIG. 2. Specifically, a linear array of photodiode sensors 10 are connected by means of amplifiers 20 and voltage comparators 21, shown in more detail in FIG. 3, in such a manner as to provide a signal only upon occurrence of an event.

As shown in FIG. 3, each sensor 10 is provided with two amplifiers 20A and 20B, one providing a dampened recent average output of the signal from sensor 10, and the other providing an instantaneous output. Accordingly, when the state of sensor 10 changes, the output from the dampened amplifier 20A changes much slower than the output from instantaneous amplifier 20B. Thus, voltage comparator 21 recognizes a voltage difference and provides a signal to load control 27 to initiate acquisition of data. Diodes 26 provide a logic OR function in response to the output from a specific sensor 10 to load control 27 while isolating each sensor 10 from the other sensors 10.

Load control logic 27 includes relatively straight-forward logic including a flip-flop to initiate gating of load clock 28, a counter of a capacity twice that of the capacity of the ganged shift registers 24 and 25 with capacity for response at one-half full count and at full count, and an inverter.

Basically, load control logic 27 is activated upon the occurrence of an event and functions in one of two symmetrical modes. For instance, as a first mode, signal "load A" is provided to AND gate 30 and AND gate 32 from load control 27. "Load shift" signal from load control logic 27 provides the load clock 28 frequency to AND gate 30 thereby providing an output from AND gate 30 at the load clock 28 frequency to OR gate 34; and, accordingly, the load clock frequency is provided to ganged shift registers 24 which acquire data from sensors 10 at the load clock 28 frequency.

Since, in the mode under discussion, load control 27 provides no "load B" signal to either AND gate 35 or AND gate 32, OR gate 37 is not activated by AND gate 35. However, load A output from load control logic 27 provides a signal to AND gate 32 and an "unload shift" signal is provided to AND gate 32 from unload control logic 40 thereby providing to OR gate 37 an output from AND gate 32 which unloads one tier of data from ganged shift registers 25 into shift register 42. Unload control logic 40 provides "unload B" signal to AND gate 44, but, in the mode under consideration, provides no such signal to AND gate 46. Accordingly, the frequency from more conventional rate unload clock 39 is applied to shift register 42 and data thus is unloaded from shift register 42 through AND gate 44 and OR gate 50 to an appropriate data system 52.

In addition to determining the section of the system being unloaded through the provision of either unload B signal or unload A signal, the former in the above discussion, unload control logic 40 also includes a counter controlled by unload clock 39. Thus, as shift register 42 is unloaded into data system 52, a counter in unload control logic 40 is up-counted until a count corresponding to the number of sensors 10 in the sensor array is reached. At this point, the entire tier previously unloaded into shift register 42 has been loaded into data system 52. Accordingly, unload control logic 40 provides concurrently unload shift signal to AND gate 32 thereby right-shifting ganged shift registers 25 one tier, and also "dump B" signal which enables shift register 42 to accept a tier of data from ganged shift registers 25. Shift register 42 is then unloaded serially to data system 52 as discussed above.

In addition, unload control logic 40 also counts the number of unload shift signals and, upon reaching a count equivalent to the tier capacity of ganged shift registers 25, discontinues unloading of ganged shift registers 25 and simply waits until ganged shift registers 24 have been filled to begin unloading ganged shift registers 24 in a similar manner.

As is apparent from the above discussion, load control logic 27 acquires data at the frequency of load clock 28 in one of ganged shift registers 24 or 25 while, essentially independently, unload control logic 40 unloads the other of ganged shift registers 24 or 25 at the frequency of unload clock 39. Load control logic 27 counts the entries into ganged shift registers 24 or 25, and when capacity is reached, provides "unload activate" signal to unload control logic 40 to initiate unloading of the newly saturated ganged shift registers 24 or 25. Also, the inverter in load control logic 27 is activated thereby symmetrically switching the states AND gate 30 and AND gate 35 to initiate loading of the other of ganged shift registers 24 or 25. However, if the previously loaded ganged shift registers 24 or 25 have not been completely unloaded into data system 52, the system is overloaded and "inhibit" signal from unload control logic 40 inactivates the load control logic 27 and acquisition of new data until unloading of the subject ganged shift registers 24 or 25 is completed. Thereupon, the data acquisition process continues and unload control logic 40 immediately initiates unloading of the saturated ganged shift registers 24 or 25.

Figure 4:
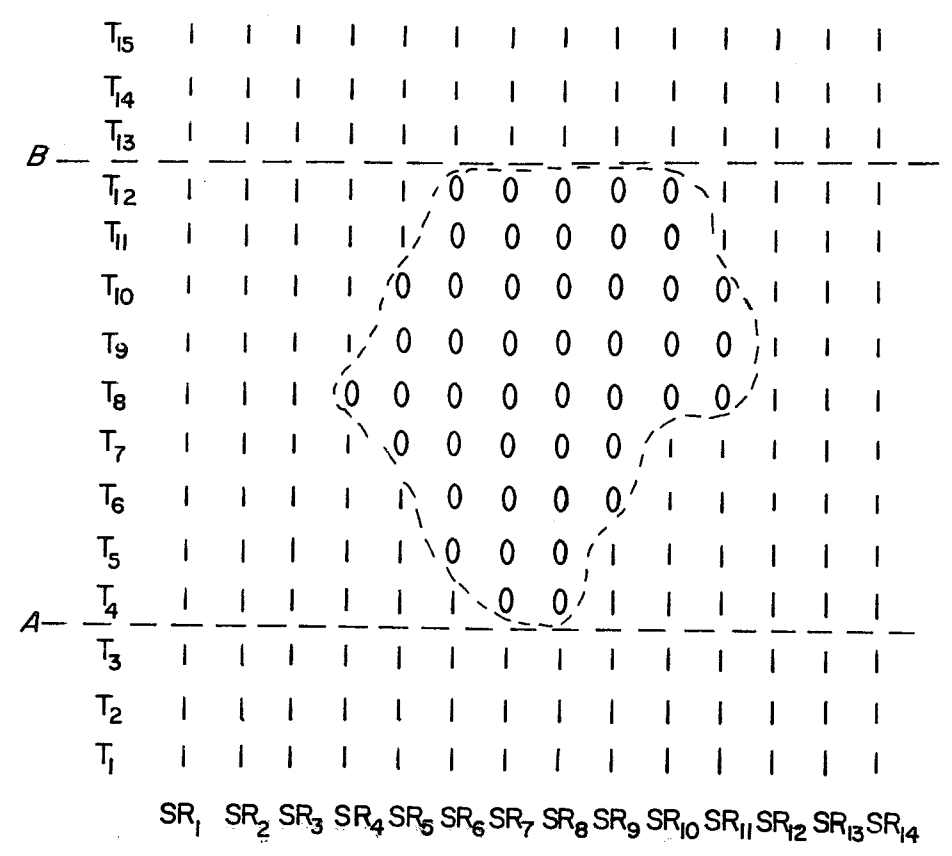

The nature of the data and the advantage of the instant invention's preferred embodiment will be more readily appreciated with reference to FIG. 4 wherein the individual shift registers of ganged shift registers 24 or 25 are represented on the abscissa as SR-1 through SR-14, and specific sampling of sensors 10 are shown at T-1 through T-15 on the ordinate. It will be apparent at times T-1 through T-3 no particle is shadowing sensors 10 and, accordingly, all sensors report a 1 condition. However, above Line A, i.e., at T-4, a particle (ghosted) shadows the sensors associated with SR-7 and SR-8, thereby providing a voltage change between filtered amplifier 20A and instantaneous amplifier 20B, and, accordingly, an output from voltage comparator, as shown in FIG. 3. This initiates activation of load control logic 27 and at T-4 through T-12 acquisition of data is provided. However, above Line B, i.e., between T-12 and T-13, sensors 10 associated with SR-6 through SR-10 change from 0 shadowed condition to 1 illuminated condition thereby providing another salient output from voltage comparator 21 and deactivates the system. As a result, according to the preferred embodiment of the instant invention as illustrated in FIGS, 2 and 3, the system would not acquire data at T-1 through T-3 and T-13 through T-15 of FIG. 4. The shape of the particle ghosted is indicated by shadowed 0 states of sensors 10 with, in the illustration, the horizontal dimension at any time being provided by the condition of the array of sensors 10, and the vertical dimension being provided by the sampling rate, i.e., T-4 through T-12.

Summarily, an initial advantage of the instant invention is the rapid acquisition of data by means of ganged shift registers with at least one of the shift registers being associated with each sensor. In a more preferred embodiment, and in view of the rapid rate of data acquisition possible, means are provided to inactivate the acquisition section of the system between events, and to automatically activate the acquisition section of the system upon the occurrence of an event. However, data delivery continues at a conventional rate and arrangement. Thus, the system is, at any given time, functionally divided into two relatively independent sections whereby data is acquired rapidly and stored in the data acquisition portion of the system, and the data is unloaded at more conventional rates and in more conventional arrangements from the unload portion of the system. By providing at least two symmetrical systems, one portion of the system can be unloaded while data is acquired in the other, symmetrical portion of the system.

Though only fundamental and preferred embodiments of the instant invention have been illustrated and described in detail, it is anticipated that those skilled in the art will readily recognize various modifications, alternatives and functional equivalents thereof. Accordingly, the invention is to be limited only by the following claims.

What is claimed is:

1. A system for high-speed acquisition of two-dimensional data, comprising: a linear array of sensors, at least two groups of ganged shift registers, each of the sensors being connected to at least one shift register in each group, activation means interposed between the linear array and the ganged shift registers, the activation means being responsive to a change of condition from that of each sensor being at a common state corresponding to the absence of an event occurrence to a condition in which at least one sensor senses an event to activate sampling of the sensors and recording in the ganged shift registers, the activation means further being responsive to a change of condition to each sensor being at a common state corresponding to the absence of an event occurrence from a condition in which at least one sensor senses an event to terminate sampling of the sensors and recording in the ganged shift registers, load clock means connected to the ganged shift registers to periodically sample the condition of the sensors and enter the condition of the sensors as one tier of data in at least one group of ganged shift registers when the activation means indicates the occurrence of an event, load control logic means connected to the load clock means and the activation means to count the number of tiers entered into a first group of the ganged shift registers, to shift the entry of additional tiers to the second group of ganged shift registers upon saturation of the first group of ganged shift registers, and to initiate unloading of the saturated group of ganged shift registers while the second group of ganged shift registers is being loaded, an unload clock means, an unload shift register connected to the unload portion of each group of ganged shift registers to receive in parallel a tier of data unloaded from a given group of ganged shift registers, the unload shift registers being connected to the unload clock means to serially unload the individual shift register bit by bit into a conventional data system at the unload clock means frequency, and unload control logic means to shift one tier of data from one group of ganged shift registers into the associated unload shift register, count the bits unloaded into the conventional data system at the unload clock means frequency, and, upon reaching a count equal to the number of sensors in the sensor array, shift another tier of data from the group of shift registers into the unload shift register, whereby two-dimensional data may be rapidly acquired and stored in one group of ganged shift registers at the high load clock means frequency while the other group of ganged shift registers is unloaded at a conventional frequency of the unload clock means.

2. A system as claimed in claim 1 in which the sensors are photodiodes and illumination means are included whereby the sensors are responsive to a shadow thereon resulting from the interposing of an article between the illumination means and the sensors.

3. A system as claimed in claim 2 in which the activation means comprise dampened output amplifiers, instantaneous output amplifiers, voltage comparators and diodes, with a dampened output amplifier and an instantaneous output amplifier connected in parallel between each sensor and a voltage comparator, and the output from the voltage comparator is connected to the load control logic means to initiate and terminate sampling of the sensors.

4. A system as claimed in claim 1 in which the unload control logic means counts the number of tiers unloaded into the unload shift register and inhibits the load control logic means to preclude loading of further data into the group of ganged shift registers actively being unloaded until a count equal to the number of tiers in the group of ganged shift registers being unloaded is reached.

5. A system for acquisition of two-dimensional data comprising: a linear array of a plurality of discrete sensors, at least two groups of ganged shift registers, each of the sensors being in communication with at least one shift register in each group of ganged shift registers, load control logic means, load clock means connected to the ganged shift registers through the load control logic means, and activation means interposed between the sensor array and load control logic means, the activation means being responsive to the occurrence of an event to activate the load control logic means to provide the load clock means signal to at least one group of ganged shift registers to thereby sample the condition of the linear array of sensors at the load clock means frequency, the load control logic means further including a counter of twice the capacity of the number of tiers in the ganged shift registers with a response at one-half the full count, the output from the counter being connected to shift means to shift loading of data from one group of ganged shift registers to another group of shift registers upon accumulation of a count corresponding to the number of tiers in the ganged shift registers, the output from the load control logic means counter also being connected to unload control logic means to initiate unloading of the loaded group of ganged shift registers upon such shift, unload shift registers, one each being associated with each group of ganged shift registers with one shift register in each group of ganged shift registers being in communication with one position in the unload shift register to facilitate unloading of a single tier of data from the ganged shift registers into associated unload shift register, unload clock means in communication with the unload shift register and the unload control logic means to unload data from the unload shift register at the unload clock means frequency into a conventional data system, and a counter in the unload control logic means to count the bits unloaded from the unload shift register and, upon reaching a count equal to the position in the unload shift register, to unload another tier of data from the group of ganged shift registers into the unload shift register, whereby data may be acquired at a high rate according to the load clock means frequency and stored in the ganged shift registers, and, upon saturation of all tiers in a group of ganged shift registers, unloaded therefrom at a more conventional rate according to the unload clock means frequency and provided bit by bit at such conventional frequency to a conventional data system.

6. A system as set forth in claim 5 in which the unload control logic means provides an inhibit signal to the load control logic means and prevents loading of data into a group of ganged shift registers while that group of ganged shift registers is being unloaded by the unload control logic means.

7. A method of acquiring intermittently occurring data at rapid rates while providing the data to data systems at convention rates comprising: sensing an event by means of a linear array of sensors, reacting activation means in response to and only during the occurrence of an event, entering at a load clock frequency the condition of the array of sensors into a group of ganged shift registers only during the reaction of the activation means with the condition of a given sensor being recorded at a specific shift register, counting the number of entries into the group of ganged shift registers, shifting the acquisition of data into a parallel group of ganged shift registers upon saturation of the group of ganged shift registers with data, unloading a tier of data from the saturated group of shift registers into a single shift register with each of the ganged shift registers communicating with one position in the single shift register, unloading data bit by bit from the single shift register at a conventional rate into a conventional data system, unloading another tier of data into the single shift register upon completion of the unloading of the initial tier of data until each tier of data from the saturated ganged shift registers has been unloaded into the single shift register on a tier-by-tier basis and into the data system on a bit-by-bit basis and, upon saturation of the second parallel group of ganged shift registers, repeating the process with a parallel system involving another single shift register while again repeating the process of loading the first group of ganged shift registers.

* * * * *